(12) United States Patent
Hindman et al.

(10) Patent No.: US 8,131,516 B2
(45) Date of Patent: Mar. 6, 2012

(54) CUSTOM EQUATIONS FOR THE UNFOLDING OF SHEET METAL

(75) Inventors: Seth A. Hindman, Tigard, OR (US); Matthew J. Bussey, Phoenix, AZ (US)

(73) Assignee: Autodesk, Inc., San Rafael, CA (US)

( * ) Notice: Subject to any disclaimer, the term of this patent is extended or adjusted under 35 U.S.C. 154(b) by 665 days.

(21) Appl. No.: 12/258,148

(22) Filed: Oct. 24, 2008

(65) Prior Publication Data

US 2010/0106463 A1    Apr. 29, 2010

(51) Int. Cl.
*G06F 17/50* (2006.01)
(52) U.S. Cl. ............................................. 703/1; 700/98
(58) Field of Classification Search ........................ 703/1
See application file for complete search history.

(56) References Cited

U.S. PATENT DOCUMENTS 4,912,644 A * 3/1990 Aoyama et al. .................. 700/98
(Continued)

OTHER PUBLICATIONS

Toh et al, "A Feature-Based Flat Pattern Development System for Sheet Metal Parts", Journal of Materials Processing Technology 48, pp. 89-95, 1995.*

(Continued)

*Primary Examiner* — Mary C Jacob
(74) *Attorney, Agent, or Firm* — Gates & Cooper LLP

(57) ABSTRACT

A computer implemented method, apparatus, and article of manufacture provide the ability to utilize custom equations for the unfolding of sheet metal in a solid modeling application. A drawing model is obtained and defines a sheet metal object in the solid modeling application. User input is accepted that defines a custom equation for a first variable that is directly used to calculate a developed length for a bend in the sheet metal object. The custom equation is converted into a standard equation that produces the developed length and is accepted by a modeling kernel of the solid modeling application. The modeling kernel dynamically displays an unfolded version of the sheet metal object based on the standard equation and the calculated developed length without exposing the standard equation to the user.

21 Claims, 13 Drawing Sheets

U.S. PATENT DOCUMENTS 5,307,282 A * 4/1994 Conradson et al. ........... 700/103
5,689,435 A * 11/1997 Umney et al. ..................... 703/1
6,525,745 B1 * 2/2003 Phelan et al. .................. 345/676
6,922,602 B2 * 7/2005 Itoh ............................... 700/118

OTHER PUBLICATIONS

Lombard, Matt, "SolidWorks 2007 Bible", John Wiley & Sons, Apr. 30, 2007, Part 7, Chapters 29 and 30.*

Hindman et al, "A Virtual Design System for Sheet Metal Forming", Journal of Materials Processing Technology, 84, pp. 107-116, 1998.*

Rao et al, "An Integrated Manufacturing Information System for Mass Sheet Metal Cutting", Int J Adv Manuf Technol (2007) 33: 436-448.*

Huang et al, "An Elasto-Plastic Finite Element Analysis of Sheet Metal U-Bending Process", Journal of Materials Processing Technology, 48 (1995), pp. 151-157.*

* cited by examiner

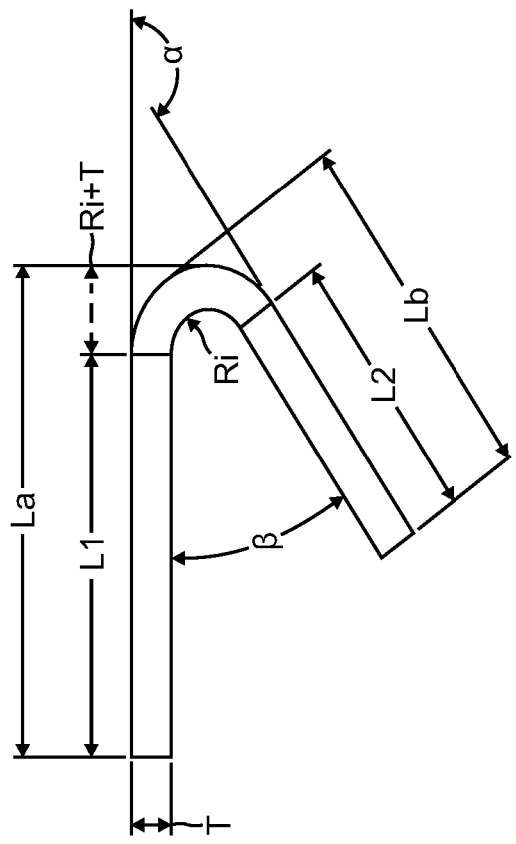
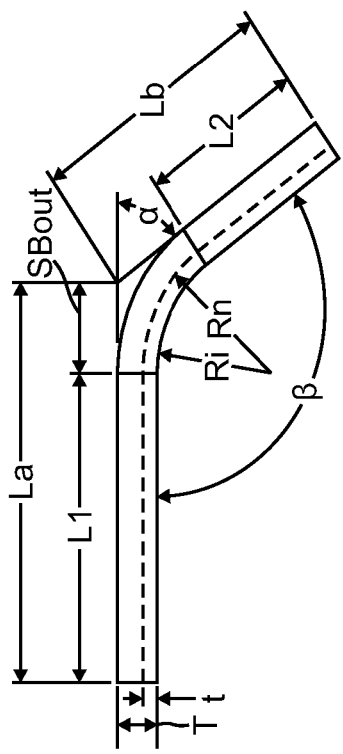
FIG. 5
(PRIOR ART)

| Bend Process | Ratio R/T | K Factor by Material "Type"... | | |
|---|---|---|---|---|
| | | Soft | Medium | Hard |
| Air Bending | 0 ~ 1 | 0.33 | 0.38 | 0.4 |
| | 1 ~ 3 | 0.4 | 0.43 | 0.45 |
| | > 3 | 0.5 | 0.5 | 0.5 |
| Bottoming | 0 ~ 1 | 0.42 | 0.44 | 0.46 |
| | 1 ~ 3 | 0.46 | 0.47 | 0.48 |
| | > 3 | 0.5 | 0.5 | 0.5 |
| Coining | 0 ~ 1 | 0.38 | 0.41 | 0.44 |
| | 1 ~ 3 | 0.44 | 0.46 | 0.47 |
| | > 3 | 0.5 | 0.5 | 0.5 |

FIG. 6
(PRIOR ART)

| Bend Compensation Formula | Valid β Range |
|---|---|
| $V = \pi * \left(\frac{180° - \beta}{180°}\right) * \left(R_i + \frac{T}{2} * K_{DIN}\right) - 2 * (R_i + T)$  (Eq. 20a) | $0° \leq \beta \leq 90°$ |
| $V = \pi * \left(\frac{180° - \beta}{180°}\right) * \left(R_i + \frac{T}{2} * K_{DIN}\right) - 2 * (R_i + T) * tan\left(\frac{180° - \beta}{2}\right)$  (Eq. 20b) | $90° < \beta \leq 165°$ |
| $V = 0$  (Eq. 20c) | $165° < \beta \leq 180°$ |

(21)

where:

$$K_{DIN} = \begin{cases} 0.65 + 0.5 * \log\left(\frac{R_i}{T}\right), & 0.05 \leq \frac{R_i}{T} \leq 5 \\ 1, & 5 < \frac{R_i}{T} \end{cases}$$

FIG. 7
(PRIOR ART)

CUSTOM EQUATIONS FOR THE UNFOLDING OF SHEET METAL

BACKGROUND OF THE INVENTION

1. Field of the Invention

The present invention relates generally to solid modeling software applications, and in particular, to a method, apparatus, and article of manufacture for utilizing custom user-defined equations to calculate a developed length for a bend in the unfolding of sheet metal in a solid modeling application.

2. Description of the Related Art

Many objects and projects are built using sheet metal that is bent by a commercial shop (or other entity) based on customer specifications. However, the customer specifications must be provided to the commercial shop in an understandable manner. Many customers create their objects and designs in a three-dimensional (3D) solid modeling application. The 3D solid modeling application may be used to unfold the object to provide an illustration and details regarding how to bend a sheet metal into the object. However, the prior art methods for unfolding sheet metal do not provide the user with the ability to customize and/or refine the results of the unfolding process. Such problems may be better understood with an explanation of prior art solid modeling systems and the unfolding process.

Over the recent past, designers have changed their fundamental approach to graphics design, moving from two-dimensional (2D) drawing systems to three-dimensional (3D) solid modeling systems. New software makes solid modeling technology available and affordable to virtually anyone. Solid modeling is a technique that allows designers to create dimensionally accurate 3D solid models in a 3D space represented within a computer, rather than traditional 2D drawings. 3D solid models include significantly more engineering data than 2D drawings, including the volume, bounding surfaces, and edges of a design.

With the graphics capabilities of today's computers, these 3D solid models may be viewed and manipulated on a monitor. In addition to providing better visualization, 3D solid models may be used to automatically produce 2D drawing views, and can be shared with manufacturing applications and the like.

Some 3D solid modeling systems generate parametric feature-based models. A parametric feature-based model is comprised of intelligent features, such as holes, fillets, chamfers, etc. The geometry of the parametric feature-based model is defined by underlying mathematical relationships (i.e., parameters) rather than by simple unrelated dimensions, which makes them easier to modify. These systems preserve design intent and manage it after every change to the model.

Users creating a 3D model for sheet metal often request additional methods for defining the results of a sheet metal unfolding process. These requests can be very niche or industry specific and do not globally or generically appeal to the entire 3D solid modeling application user base. Users also have the need to refine/customize the unfolding results based upon specific types of manufacturing equipment as well as over a range manufacturing variability like tooling size, sheet thickness, material type and applied deformation/bend angle. Prior art methodologies incorporate a select set of typical unfolding methods and/or use predefined measurements and equations for unfolding sheet metal in the 3D application. In this regard, specific equations and parameters may be used to define how a metal sheet should bend and how to calculate the length of sheet metal when a bend is unfolded. To better understand unfolding and the unfolding process, a description of bend parameters and prior art unfolding techniques is useful.

FIG. 1 illustrates a bend and the parameters used herein. T represents the thickness of the sheet metal part. Ri represents the inside radius of a bend. t represents the neutral line position that is the distance from the inside bend to the neutral line. The neutral line is the line along which no deformation occurs during the bending process. Rn is the neutral radius or the radius of the neutral line. Ln is the bend allowance that is the arc length of the neutral line in the bend. Ln does not change during the bending process but is constant. α is the bend angle/outside bend angle that is the angle of the bend or the outside angle between the flange and the base plate. β is the opening angle/inside bend angle and is the supplement of α, or the inside angle between the flange and the base plate. SBout is the outside set back or the distance from the bend line to the virtual sharp intersection of the outside flange faces. Typically, a value can only be determined for SBout, if $\alpha \leq 90°$. SBin is the inside set back or the distance from the bend line to the virtual sharp intersection of the inside flange faces. Typically, a value can only be determined for SBin, if $\alpha \leq 90°$.

Mathematical Definitions for Bend Parameters

In view of the above definitions, a few basic mathematical relationships can be expressed and are useful:

$$t = R_n - R_i \quad (1)$$

$$\beta = 180° - \alpha \quad (2)$$

$$SB_{out} = \tan\left(\frac{\alpha}{2}\right) \cdot (R_i + T) \quad (3)$$

$$SB_{in} = \tan\left(\frac{\alpha}{2}\right) \cdot R_i \quad (4)$$

Each equation represents a relationship between the different parameters defined above. Equation (1) provides that the neutral line position is equal to the neutral radius minus the inside radius. In equation (2), the value for β is the simple supplement of angle α or 180–α. SBout is equal to the tangent of α/2 multiplied by the sum of the thickness of the sheet metal part and inside radius of the bend. Sbin is equal to the tangent of α/2 multiplied by a particular radius 1.

Bend Allowance

FIG. 2 illustrates bend allowance calculations for calculating the lengths of unfolded bends. The most basic way to calculate the length of an unfolded part is by taking the length of a line in the bend that does not change during the bend process. This is known as the Neutral Line or Neutral Axis; and it is the line along which no strain in the material has taken place. The goal is to get the total length (L) of a workpiece as shown in FIG. 2:

$$L = L_1 + L_2 + L_n \quad (6)$$

$L_n$ is known as the Bend Allowance. Since it is the arc length of the Neutral Line, it can be calculated using a simple equation:

$$L_n = \alpha \cdot \pi / 180° \cdot R_n = \alpha \cdot \pi / 180° \cdot (R_i + t) \quad (7)$$

where α is in Radians. The Neutral Line is located at a distance t from the inside of the bend radius. This distance is determined experimentally, and is usually expressed as a percentage of the total thickness (T):

$$t = K \cdot T \qquad (8)$$

where typically:

$$0 \leq K \leq 1 \qquad (8a)$$

It can be noted that K can be less than 0 or greater than 1 in theory and even in practice, but in general it is expected to be between 0 and 1. This percentage K is known as the K-Factor, and is determined in a variety of ways (which is discussed below). Given the above, the bend allowance can always be calculated by the following:

$$L_n = \alpha \cdot \pi / 180° \cdot (R_i K \cdot T) \qquad (9)$$

Bend Deduction

The beauty of the Bend Allowance method is that it can be calculated using a provided K factor and the known properties of the bend. Getting the K factor to begin with is another problem.

Several rule of thumb and standardized K factors exist, but in general K factors are determined experimentally. K factors express the amount of stretch when bending sheet metal. The actual amount of stretch is dependent on several factors:

Material Properties
    Material Thickness
    Strength of material
    Material Hardness
    etc.
Tooling and bend properties
    Angle of the Bend
    Radius of the Bend
    Type of Bend operation
    etc.

This process to calculate K Factors requires taking blank sheets of known lengths, folding them up, and measuring the lengths of the two sides of the bend. Measuring is the real trick. Bending a known length of sheet metal is easy, but to calculate the Bend Allowance (and therefore the K Factor), the lengths of $L_1$ and $L_2$ must be measured. This is not easy since the exact location of the bend line is really not known. In this regard, measuring the flange lengths up to a bend is not practical in practice. Instead, it is much easier to measure to the virtual intersection (or Virtual Sharp) of the flanges. In this regard, FIG. 3 illustrates the measuring of flange lengths up to a bend (i.e., up to where the bend begins) while FIG. 4 illustrates the measuring of experimental parts using their "Virtual Sharps" (i.e., to the virtual intersections of the planes on both sides of the bend).

FIG. 5 illustrates the parameters used to determine bend deductions. As shown in FIG. 5, lengths $L_a$ and $L_b$ can be reliably measured. Experimentally the user knows the initial length of the test piece (L), and it is known that the outside of the metal is stretching, so the following can be deduced:

$$L = L_a + L_b - L_{BD} \qquad (10)$$

where $L_{BD}$ is known as the Bend Deduction, and $L_a$ and $L_b$ are not linear values:

$$L_a = L_1 + L_{SetBack} \qquad (11a)$$

$$L_b = L_2 + L_{SetBack} \qquad (11b)$$

$$L_{Setback} = \begin{cases} \tan(\frac{\alpha}{2}) \cdot (R_i + T), & 0° \leq \alpha \leq 90° \\ (R_i + T), & 90° < \alpha \leq 180° \end{cases} \qquad (11c)$$

where:
Relationship Between Bend Deduction, Bend Allowance, and K Factor

Given that L must be the same no matter how it is calculated, equation 10 and 6 are equal. This means that a relationship between the two can be determined:

$$L_1 + L_2 + L_n = L_a + L_b - L_{BD} \qquad (12a)$$

$$L_1 + L_2 + L_n = L_1 + L_{SetBack} + L_2 + L_{SetBack} - L_{BD} \qquad (12b)$$

$$L_n = 2 \cdot L_{SetBack} - L_{BD} \qquad (12c)$$

This also means that the K factor can be calculated from the Bend Deduction:

$$K = \frac{\frac{180°}{\alpha \cdot \pi} \cdot (2 - L_{SetBack} - L_{BD}) - R_i}{T} L_n = 2 \cdot L_{SetBack} - L_{BD} \qquad (14)$$

Many people use the terms Bend Allowance and Bend Deduction interchangeably. It is even common to see charts on a shop floor titled "Bend Allowance", and the chart is actually a chart of Bend Deductions. However the terms do not mean the same thing (as outlined above).

Another common mix up in terminology is the difference between the Bend Angle ($\alpha$), and the Opening Angle ($\beta$). This can lead to a lot of confusion and errors when designing and calculating flat patterns. In addition, the term Bend Compensation, as used herein, is the negative value of the Bend Deduction:

$$L_{BC} = -L_{BD} \qquad (15)$$

Common Unfold Rules

Several rules for unfolding exist; either found in standards or other sources. For truly accurate unfolding, manufacturers generate their own rules for unfolding. The description below describes known rules in industry and common practices of the prior art.

Lockheed™ Bend Allowance and K Factor

K Factors where first developed by Lockheed Martin™ in the 1950's. Typically, K Factors are a single numeric value used for either all material/thickness/angle/radius combinations, or for specific sets. This makes for a very linear, simple to use formula with Bend Allowance.

By default, some applications may use a K factor of K=0.44. This K factor is derived from the Bend Allowance formula developed by Lockheed™:

$$BA_{Lockheed} = \alpha \cdot (0.017453 \cdot R_i + 0.0078 \cdot T) \qquad (16a)$$

$$\alpha \cdot (0.0017453 \cdot R_i + 0.0078 \cdot T) = \alpha \cdot \pi / 180° \cdot (R_i K \cdot T) \qquad (16b)$$

$$K = 0.0078 \cdot 180° / \pi = 0.44 \qquad (16c)$$

Machinery's Handbook™ Bend Allowances

Machinery's Handbook™ offers three bend allowance formulae for various materials. The formulae are for bends of 90°.

| Materials | Bend Allowance Formula* | Derived K Factor |
|---|---|---|
| Soft Brass, Soft Copper | $L_n = (0.55 \cdot T) + (1.57 \cdot R_i)$ (17a) | K = 0.35 |
| Half-Hard Copper & Brass, Soft Steel, Aluminum | $L_n = (0.64 \cdot T) + (1.57 \cdot R_i)$ (17b) | K = 0.407 |
| Bronze, Hard Copper, Cold-Rolled Steel, Spring Steel | $L_n = (0.71 \cdot T) + (1.57 \cdot R_i)$ (17c) | K = 0.452 |

*Note:
for angles other than 90°, multiply the Bend Allowance $L_n$ by the Bend Angle α in degrees divided by 90:
$$L_{n(\neq 90°)} = L_n \cdot \alpha/90 \quad (17d)$$

More Sophisticated K Factor Practices

As can be seen above, K Factors can become more sophisticated as more factors are taken into account. The most basic is using different K factors for different material properties (primarily dictated by hardness and tensile strength). However tooling and the actual bend process can also dictate how much stretch is created when bending; and the size of the radius compared to the thickness can dictate how much deformation occurs.

For example, a set of rule of thumb K Factors can be used for different classes of materials depending on the three primary bending methods used: Air Bending, Bottoming, or Coining. In addition, the K Factor depends on the ratio of the Radius ($R_i$) to the Thickness (T). FIG. 6 illustrates the bend process for air bending, bottoming, and coining along with the corresponding ratio and K Factor by material type.

DIN 6935

The DIN 6935 standard outlines several practices and standards for creating bent sheet metal parts. This includes the development of a set of Bend Compensation based formulae for calculating the unfold length of bends:

$$L = L_a + L_b + V \quad (18)$$

where V is the Bend Compensation. Note that it is the negative of the Bend Deduction (as described above).

$$V = -L_{BD} \quad (19)$$

The Bend Compensation V is determined based on the Opening Angle (β), as shown in FIG. 7 with equations 20a, 20b, and 20c.

Bend Deduction Tables

While K Factors are convenient and tend to be simple to use (especially for CAD [computer-aided design] software), for the most accurate development of flat patterns, Bend Deduction tables, based on actual measured data, are the preferred method used in the prior art.

In a given manufacturing environment typically there are a finite set of materials, gauges (thicknesses), bending processes, and tooling. Because of this finite limit, generation of Bend Deduction Tables for all of the possible combinations of these is practical. Further, fabricators may provide a set of published Bend Deduction tables for designers to use.

Typically these Bend Deduction tables are created using the method described above, where samples of known length are bent and measured, and the Bend Deduction is calculated.

Historically K factors are not generated from these tables. The reason is simple: when manually drafting or drafting in 2D (e.g., as in a CAD application) to create a flat pattern drawing, using a Bend Deduction Table is simple and straightforward. All the designer needs is the dimensions of the flanges to their virtual sharps (common drawing practice), and the appropriate parameters to look up the Bend Deduction. Only simple addition is needed to calculate the final length to draw.

Most Bend Deduction tables are generated only for 90° bends. For bends other than 90°, some other provisions are used. Some companies will generate tables for all the possible angle/radius/thickness combinations. Further, tables can be extremely large. For example, a table can range from 5°~170° in 1° increments, and cover 18 different thicknesses and 13 different Radii.

Background Overview

In view of the above, it can be seen that the prior art fails to provide an easy mechanism to define and utilize K-factors and other bend calculations. In this regard, prior art products only supported linear unfolding via K factor values or equivalent linear variable via an experimentally derived static table of bend values. Such tables must be manually created on a per machine, per material basis, for each bend in a sheet metal object. In an example, one table for calculating a single bend in a sheet metal object may consume a three-inch binder. Thus, such manual calculations are burdensome and unmanageable for a large number of bends and cannot be interchanged from metal shop to metal shop due to the use of different machines.

Additional custom methods are not available nor are bounding conditions possible outside the inherent axes of the bend table definition (angle X bend radius). Further, there is no capability to create and use non-linear equations to control a bend calculation. With regard to bend tables, the prior art can only discretely approximate equations and require large, granular sets of data to obtain an adequate resolution of approximation. Such large bend tables are inherently error prone to create and/or edit. Further, the prior art fails to support algebraic user defined unfolding equations and bounding conditions.

SUMMARY OF THE INVENTION

To overcome the problems of the prior art, one or more embodiments of the invention provide the ability to for a user to define a custom equation for the unfolding of a sheet metal object and link the results of the equation to the actual topology of their design (i.e., of a sheet metal object). Further, bounding conditions can be custom defined and provide the ability to refine the user's control over unfolding results on a completely extensible unfolding platform. Users can therefore build algebraic equations that contain references to topologically evaluated design measurements used to perform an unfolding analysis and calculate a developed length for a bend in the sheet metal object. With such capabilities, users no longer need to manually create large tables on a per-machine, per-material, and per-bend basis. Further, users are provided with the ability to visually interpret equations that the user has custom defined and view the results of such equations (and changes to such equations) dynamically in real time in a solid modeling application.

BRIEF DESCRIPTION OF THE DRAWINGS

Referring now to the drawings in which like reference numbers represent corresponding parts throughout:

FIG. 5 illustrates the parameters used to determine bend deductions in the prior art;

FIG. 6 illustrates the bend process for air bending, bottoming, and coining along with the corresponding ratio and K Factor by material type in the prior art;

FIG. 7 illustrates the equations used to determine the Bend Compensation of the prior art;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Rather than incorporating a select set of typical unfolding methods, one or more embodiments of the invention allows users to define a custom equation (non-linear or otherwise) and link the result to the actual topology of 3D design. Embodiments further allow users to apply bounding conditions to refine control over unfolding results on a completely extensible unfolding platform.

Hardware Environment

Figure 1:
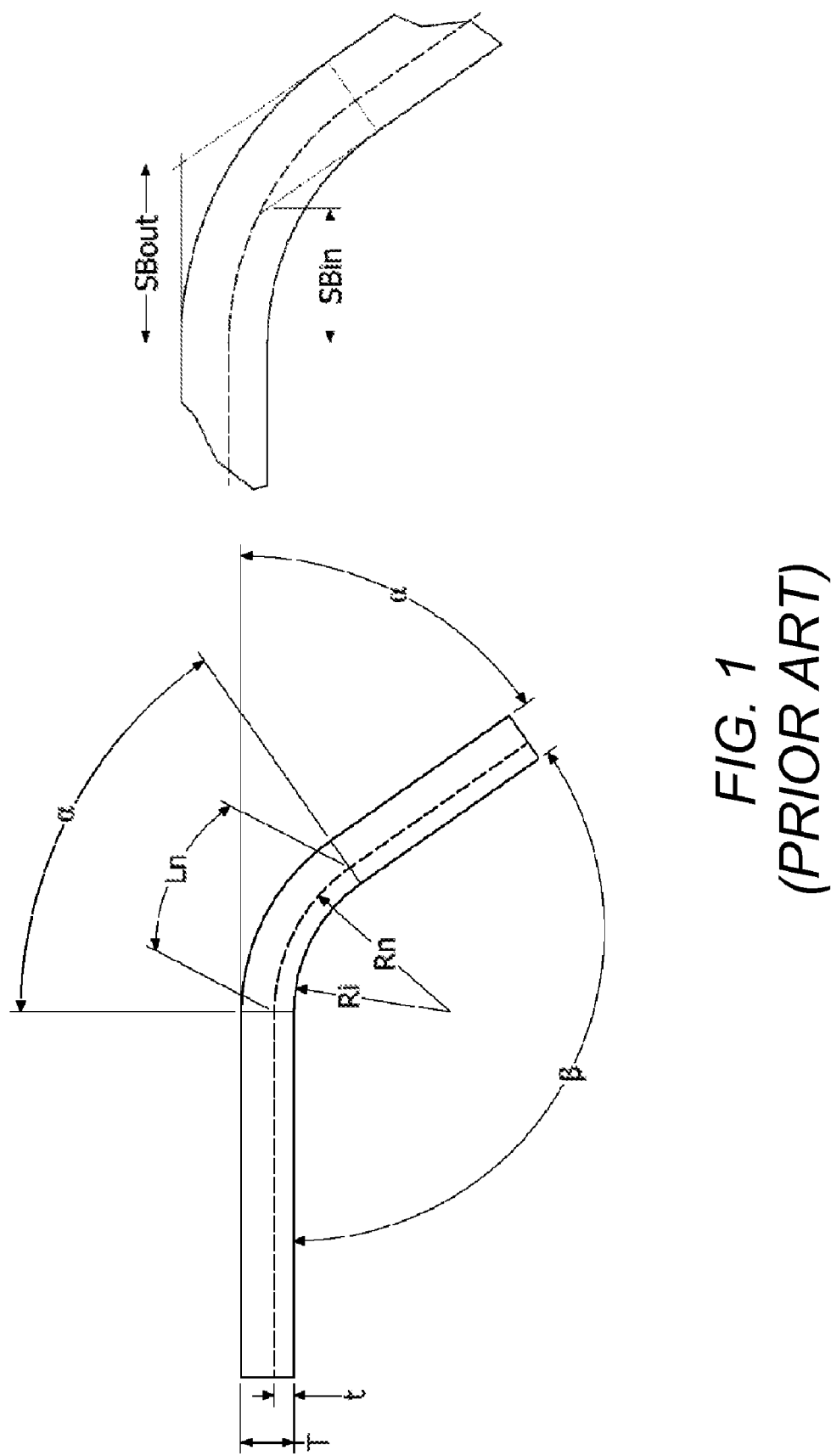
FIG. 1 illustrates a bend and the parameters used in the prior art.
Figure 2:
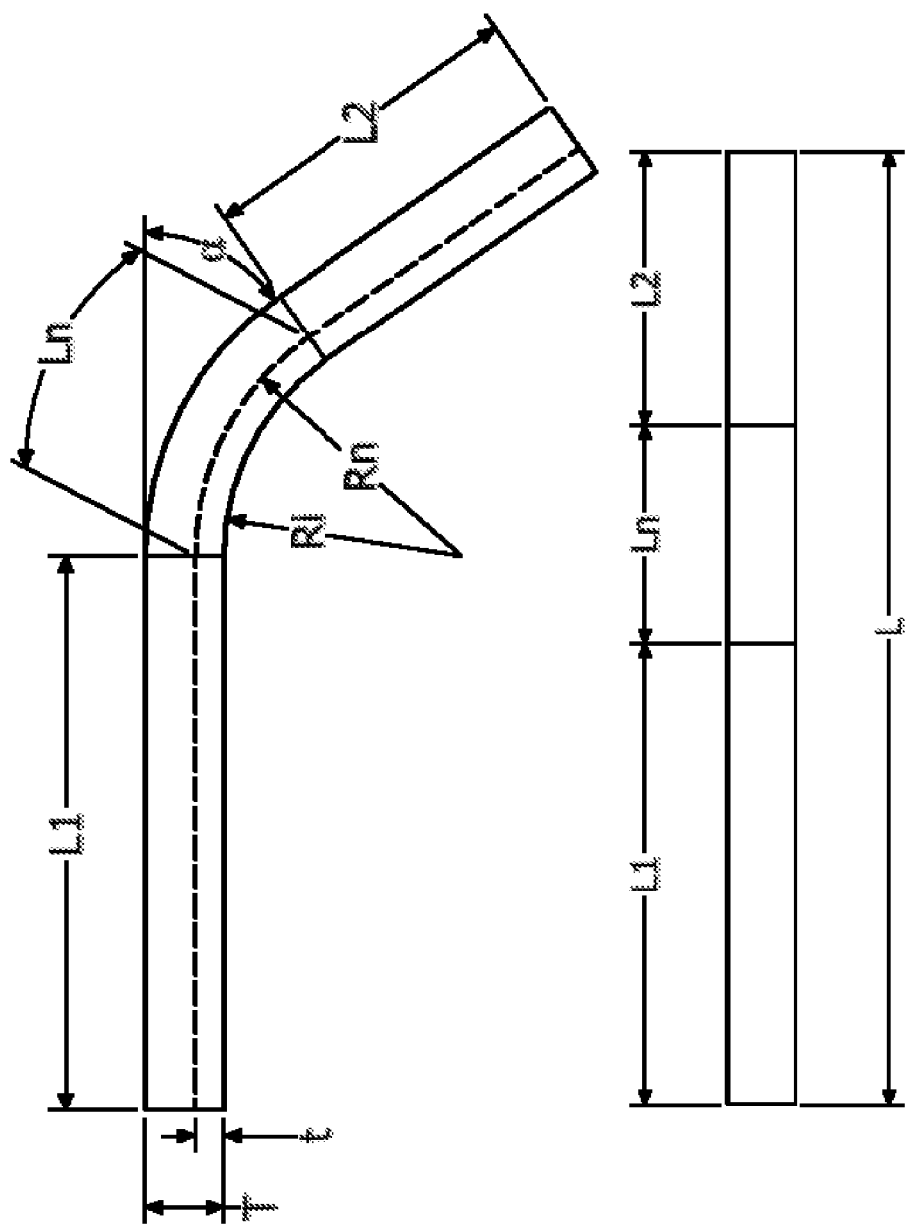
FIG. 2 illustrates bend allowance calculations for calculating the lengths of unfolded bends of the prior art.
Figure 3:
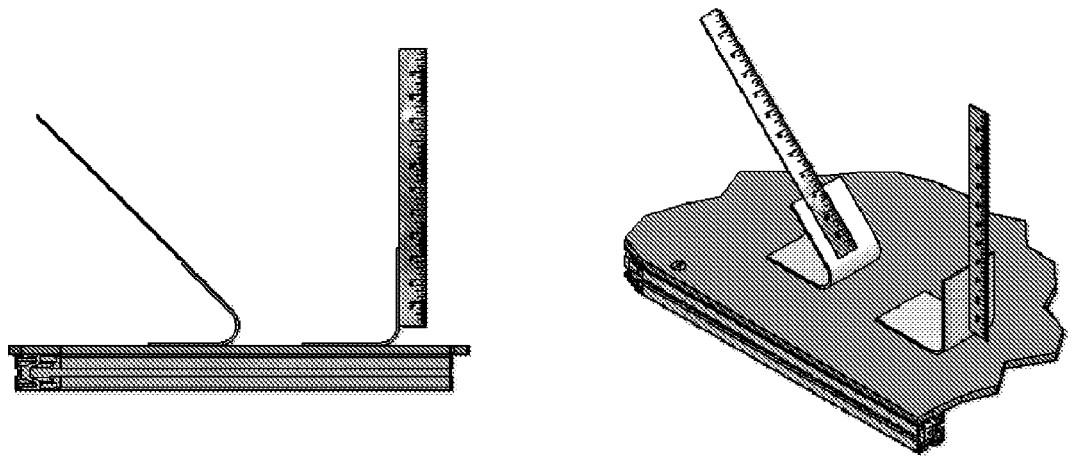
FIG. 3 illustrates the measuring of flange lengths up to a bend (i.e., up to where the bend begins) of the prior art.
Figure 4:
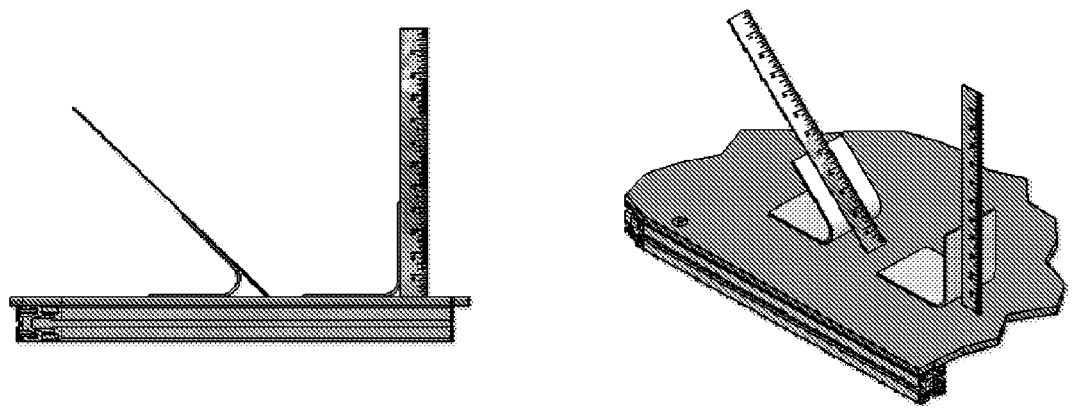
FIG. 4 illustrates the measuring of experimental parts using "Virtual Sharps" in the prior art.
Figure 8:
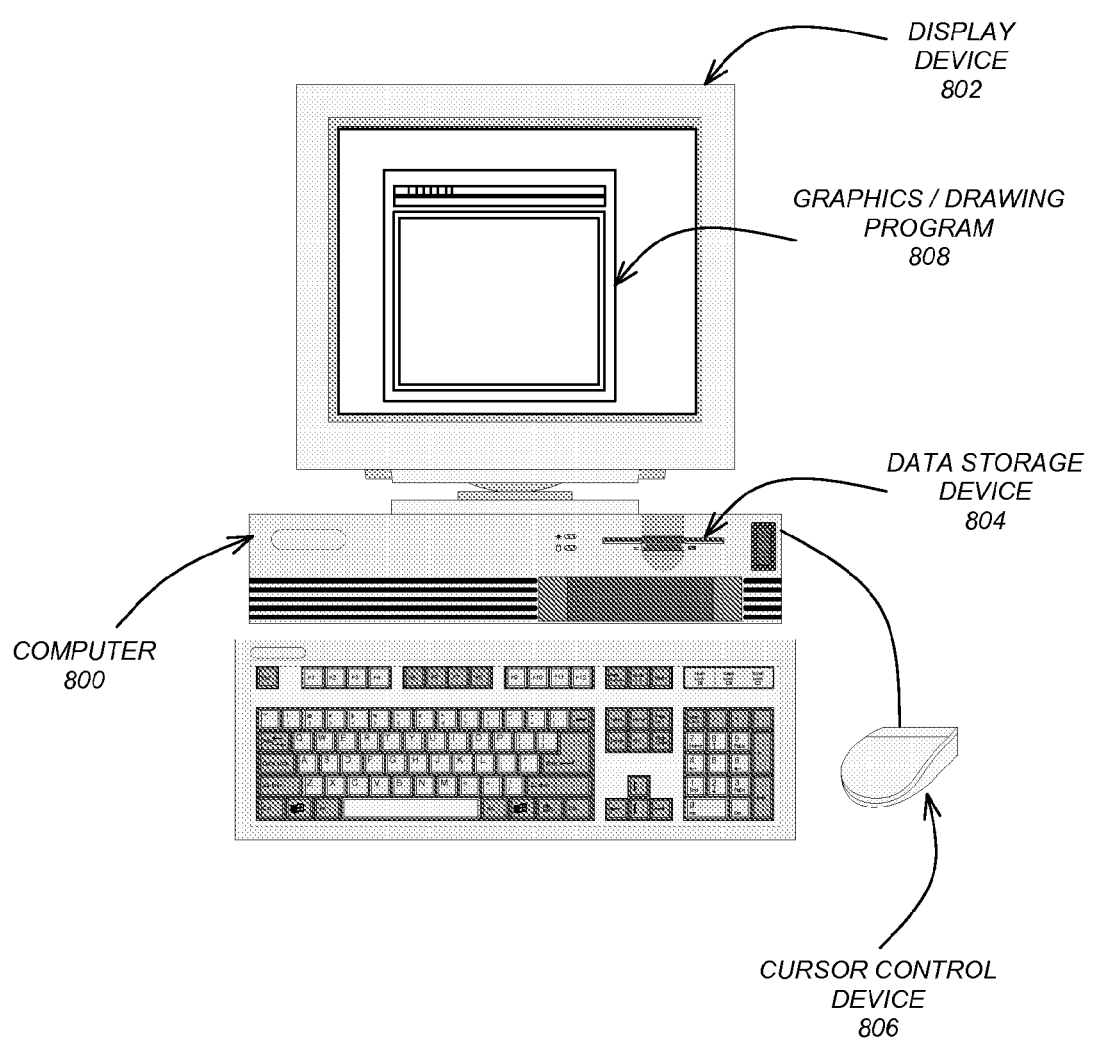
FIG. 8 is an exemplary hardware and software environment used to implement one or more embodiments of the invention.

FIG. 8 is an exemplary hardware and software environment used to implement one or more embodiments of the invention. Embodiments of the invention are typically implemented using a computer 800, which generally includes, inter alia, a display device 802, data storage devices 804, cursor control devices 806, and other devices. Those skilled in the art will recognize that any combination of the above components, or any number of different components, peripherals, and other devices, may be used with the computer 800.

One or more embodiments of the invention are implemented by a computer-implemented graphics program 808, wherein the graphics program 808 is represented by a window displayed on the display device 802. As used herein, the graphics program 808 may be computer-aided design (CAD) application, a two-dimensional (2D) modeling application, a three-dimensional (3D) modeling application (e.g., a solid modeling application), or a modeling kernel that processed and manipulates a model (2D or 3D) that is then displayed to a user on display device 802. Generally, the graphics program 808 comprises logic and/or data embodied in or readable from a device, media, carrier, or signal, e.g., one or more fixed and/or removable data storage devices 804 connected directly or indirectly to the computer 800, one or more remote devices coupled to the computer 800 via a data communications device, etc.

In one or more embodiments, instructions implementing the graphics program 808 are tangibly embodied in a computer-readable medium, e.g., data storage device 804, which could include one or more fixed or removable data storage devices, such as a zip drive, floppy disc drive, hard drive, CD-ROM drive, DVD drive, tape drive, etc. Further, the graphics program 808 is comprised of instructions which, when read and executed by the computer 800, causes the computer 800 to perform the steps necessary to implement and/or use the present invention. Graphics program 808 and/or operating instructions may also be tangibly embodied in a memory and/or data communications devices of computer 800, thereby making a computer program product or article of manufacture according to the invention. As such, the terms "article of manufacture" and "computer program product" as used herein are intended to encompass a computer program accessible from any computer readable device or media.

Those skilled in the art will recognize that the exemplary environment illustrated in FIG. 8 is not intended to limit the present invention. Indeed, those skilled in the art will recognize that other alternative environments may be used without departing from the scope of the present invention.

Computer-Implemented Graphics Program

Figure 9:
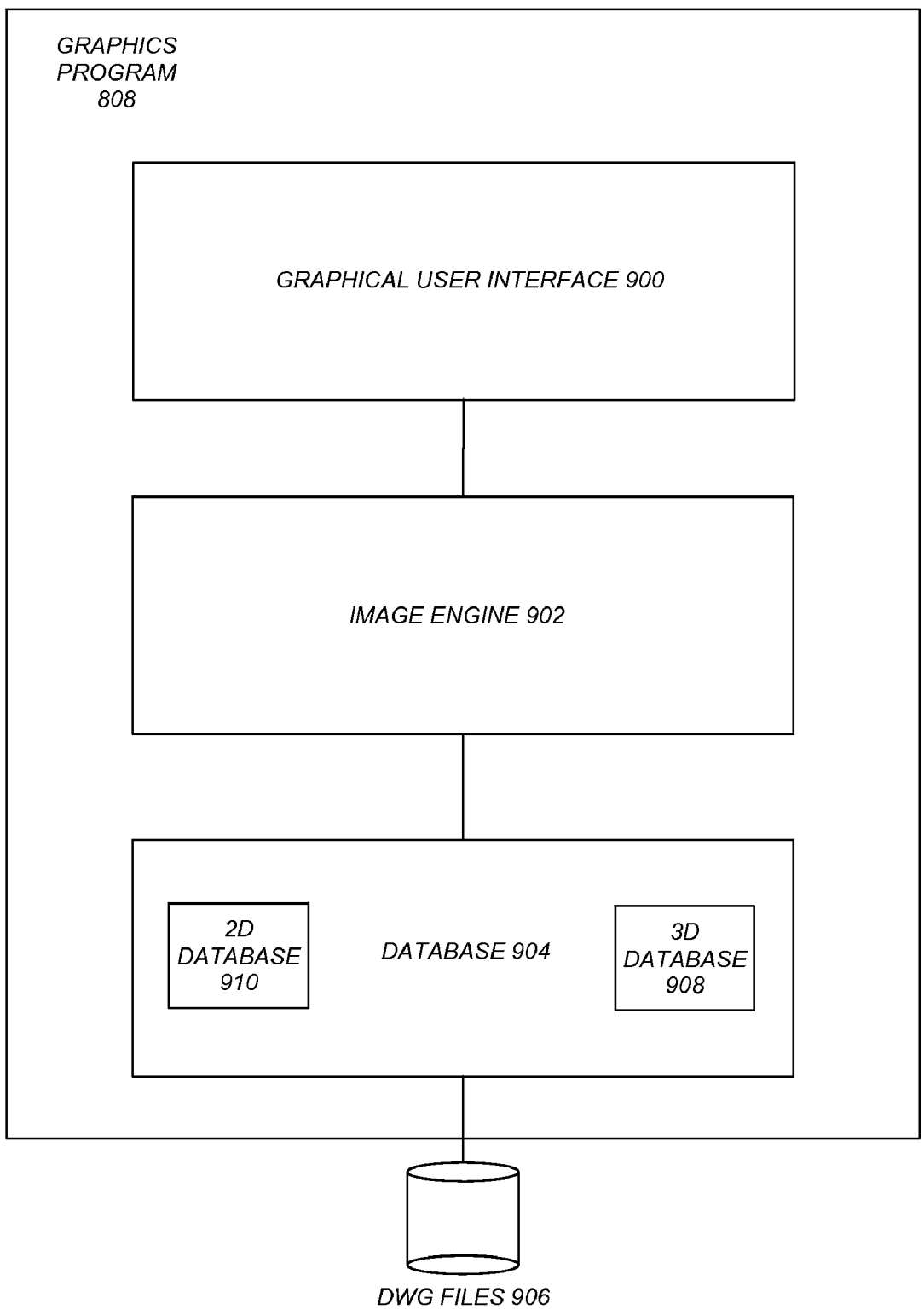
FIG. 9 is a block diagram that illustrates the components of the graphics program in accordance with one or more embodiments of the invention.

FIG. 9 is a block diagram that illustrates the components of the graphics program 808 in accordance with one or more embodiments of the invention. There are three main components to the graphics program 808, including: a Graphical User Interface (GUI) 900, an Image Engine (IME) 902, and a DataBase (DB) 904 for storing objects in Drawing (DWG) files 906.

The Graphical User Interface 900 displays information to the operator and provides the functionality for the operator's interaction with the graphics program 808.

The Image Engine 902 processes the DWG files 906 and delivers the resulting graphics to the monitor 902 for display. In one or more embodiments, the Image Engine 902 provides a complete application programming interface (API) that allows other computer programs to interface to the graphics program 808 as needed.

The Database 904 is comprised of two separate types of databases: (1) a 3D database 908 known as the "3D world space" that stores 3D information; and (2) one or more 2D databases 910 known as the "2D view ports" that stores 2D information derived from the 3D information.

Further, as described above, the image engine 902 may consist of a modeling kernel that analyzes and processes a 2D or 3D model that is displayed via graphical user interface 900.

Custom Equations

As described above, a problem with the prior art is in the process of unfolding sheet metal. A model may be created for a sheet metal object and provides for various bends in the sheet metal. To fabricate the sheet metal object, a flat piece of sheet metal must be bent to form the sheet metal object. The problem arises regarding creating a pattern that represents the unfolded sheet metal object with accurate measurements (i.e., developed length) for each of the bends in the sheet metal object. In the prior art, the calculations were either static or performed on a manual basis in an extremely time consuming and inflexible manner.

One or more embodiments of the invention provide the ability to utilize custom equations for the unfolding of sheet metal and to determine how sheet metal bends. The custom equation solution allows users to define unfolding expressions based upon equation types that provide a reference to how the expressions will be geometrically based. The equation type may be selected by the user and can be from among a list of available types including bend allowance, bend compensation, bend deduction, and k-factor. In this regard, the equation type may be selected from the four types and appropriate equations are displayed with variables that may be customized as described below.

Figure 10:
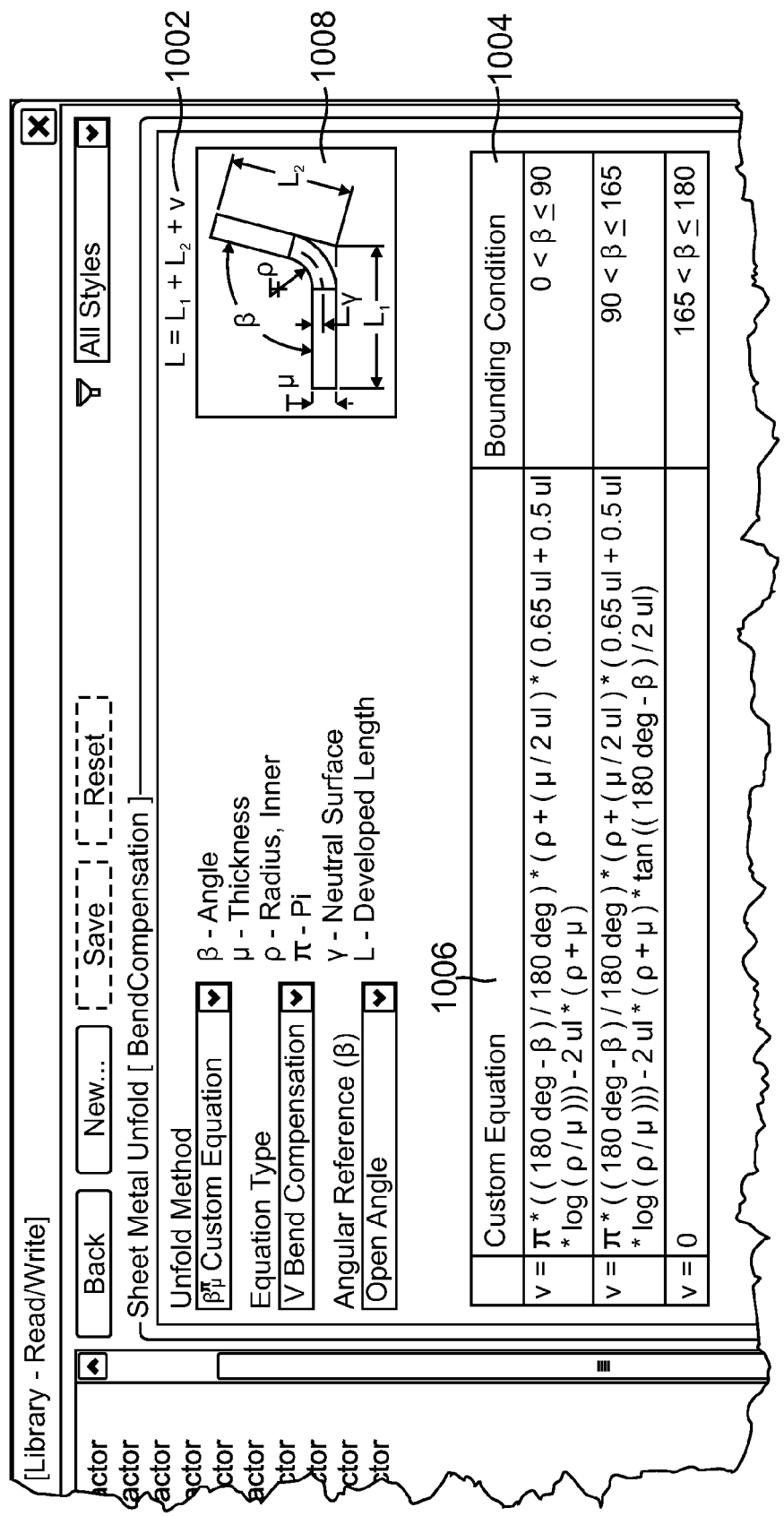
FIG. 10 illustrates a graphical representation of a bend plate as well as how their choices affect the associated variables used to compute the final unfolding result (developed length) in accordance with one or more embodiments of the invention.

FIG. 10 illustrates a graphical representation of a bend plate as well as how their choices affect the associated variables used to compute the final unfolding result (developed length) in accordance with one or more embodiments of the invention.

The general equation 1002 in the upper right corner explains to the user that for 'Bend Compensation' (one of the four types selected in the equation type field), the equation being used is $L=L_1+L_2+v$. The user is then allowed to build custom expressions that correlate to the compensation variable 'v'. These expressions can further be bounded by the conditions 1004 on the far right column in the table. In this particular example the bounding conditions are angular, where 'β' is the angular variable.

In the main equation column 1006, some variables (β, π, ρ, μ) may be highlighted (e.g., colored blue), providing the user feedback that such variables are reserved variables and for everything other than Pi are actually topologically referenced variables (as displayed in image 1008). Thus, the variables and elements in the equations are displayed in the small bitmap/image 1008 to allow the user to visualize and more easily depict the effect of changing the variables or the equation. Further, depending on the equation type selected, the equation 1002 and bitmap 1008 may change to appropriately reflect the equation type identified/selected. The displayed equation 1002, bitmap 1008, and custom equations 1006 may also dynamically update based on the type of angular reference specified (e.g., bending angle or open angle). Thus, as the user changes the angular reference or equation type, the bitmap 1008 and equation 1002 is dynamically updated in real time to reflect the user's updated selection.

Figure 11:
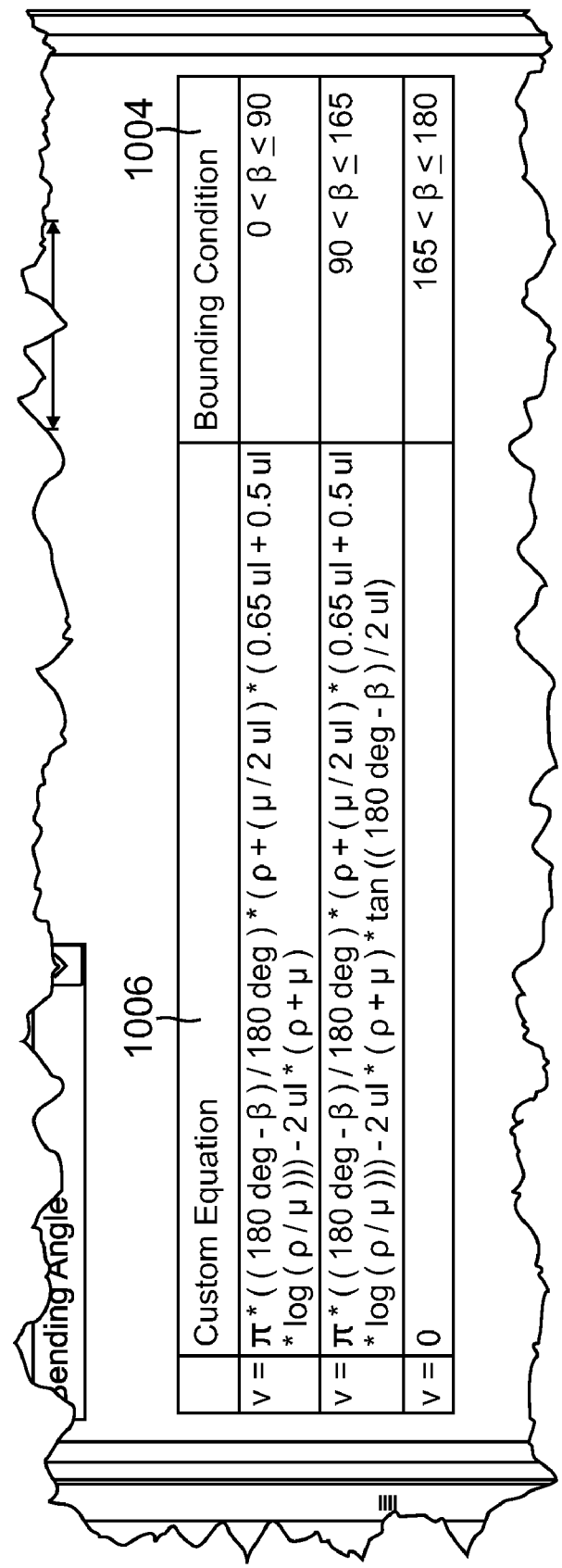
FIG. 11 is an enlarged view of the custom equation and boundary condition of FIG. 10 in accordance with one or more embodiments of the invention.

FIG. 11 is an enlarged view of the custom equation 1006 and bounding condition 1004 of FIG. 10 and illustrates how the user's choice of equation type establishes the first component of an algebraic equality in accordance with one or more embodiments of the invention. The equality is customizable with an associated custom unfolding expression 1006 as well as a related bounding condition 1004.

Figure 12:
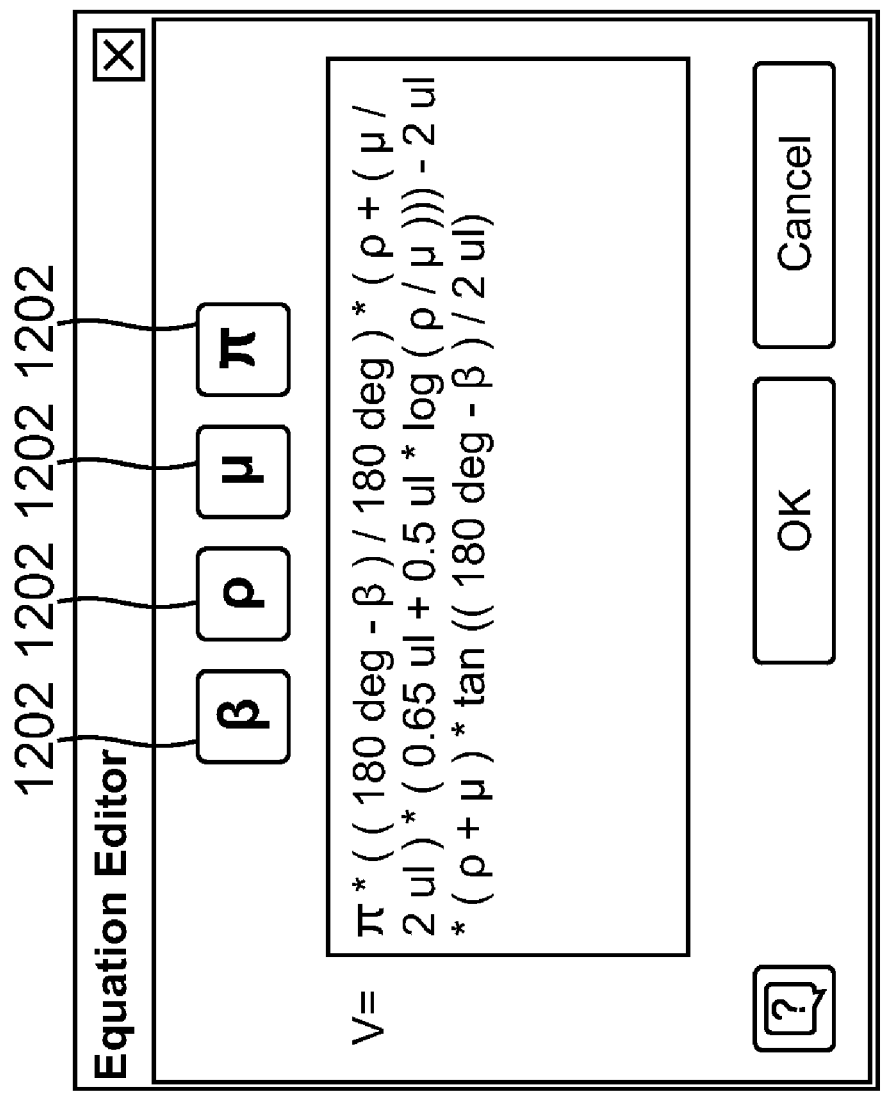
FIG. 12 illustrates an example of an equation editor in accordance with one or more embodiments of the invention.

Users can define custom equations 1006 natively within the application 108 using an editor that provides direct access for embedding topological variables into the expression. FIG. 12 illustrates an example of an equation editor in accordance with one or more embodiments of the invention. As can be seen, the user can select the desired variable 1202 while defining the variable v in the equation editor. Once the equation has been defined, the user selects "OK" to accept the custom defined algebraic expression for variable v.

Figure 13:
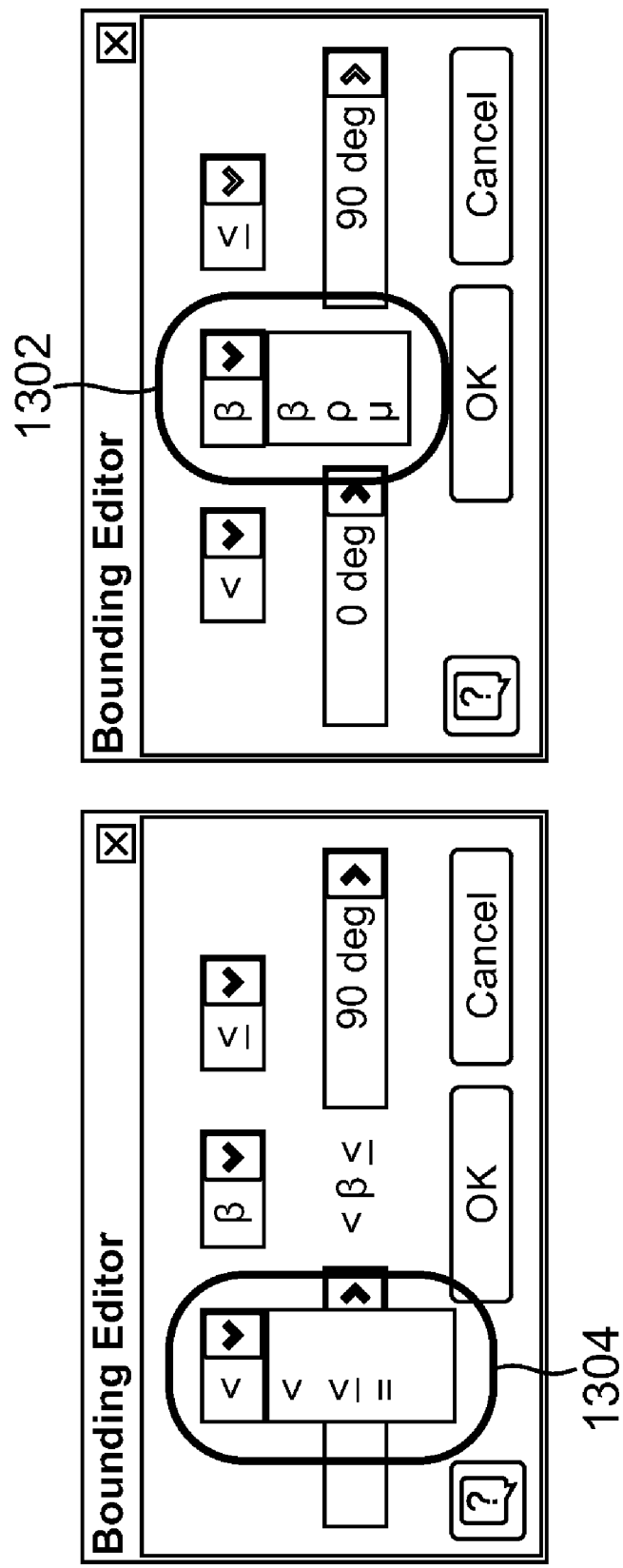
FIG. 13 illustrates bounding editors that allow the user to specify and define custom bounding conditions in accordance with one or more embodiments of the invention.

Users will have the ability to granularly control when specific customer unfolding equations should be utilized via bounding conditions. FIG. 13 illustrates bounding editors that allow the user to specify and define custom bounding conditions. The user can create numerous types of equalities or inequalities based upon different topological variables bounded by fixed or parametric conditions. As illustrated in FIG. 13, the bounding condition for the desired variable can be set using drop down menu 1302 while the inequality/equality desired be specified using drop down menu 1304. While illustrated using drop-down menus in FIG. 13, any type of graphical user interface (e.g., slider, radio buttons, etc.) can be used to define the bounding conditions in FIG. 13 or expression in FIG. 12.

Both the editors of FIG. 12 and FIG. 13 may be activated for/by the user merely be selecting the appropriate box in FIG. 10 or FIG. 11. For example, by clicking in a box below column 1006, the equation editor of FIG. 12 may be displayed while clicking or selecting a value in a box of column 1004 may activate the bounding condition editor of FIG. 13. Similarly, the user can select the "New" button of FIG. 10 to create an additional custom equation or bounding condition.

In view of the above, various custom equations can be specified for the same variable based on different bounding conditions. For example, suppose the user has chosen to utilize a bend allowance equation type based on $L=L_1+L_2+a$. The user can create several rows of custom equation 1006 with different bounding conditions. For example, the user can have one row where a=1 with the bounding condition of $0 \leq \beta \leq 74$ with another with $a=n*(\beta/180 \text{ deg})*(p+0.44*\mu)$ with the bounding condition of $75 \text{ deg} \leq \beta \leq 180 \text{ deg}$. Thus, different values for a result depending on the value of β. Such values are all custom defined by the user. Rows may be appended into column 1006 to add different custom equations for different variables as desired.

In the prior art, users were only permitted to pass in arguments to a predefined equation that was neither viewable nor directly exposed to the user. However, in embodiments of the present invention, the user can actually define the equation that is being evaluated e.g., using the editor of FIG. 12 described above. Further, this equation 1006 can be managed by bounding conditions 1004 to increase the amount of granular control based off of a few different variables. Most serious sheet metal companies (and industries) have unfolding formulas that have been developed based upon their manufacturing processes, experience, tooling and materials. These equations differ from the norm and they are forced to either add in some static windage to their KFactor value or produce large experimental bend tables. The problem with the tables is that they're time consuming to create and are truly only accurate for the specific machine, tooling and material in which they were developed. For companies that want to manage an entire manufacturing floor in multiple facilities (or across continents) this is cumbersome to say the least and impractical.

To overcome the problems of the prior art, the embodiments of the present invention enable a user to author algebraic expressions directly into a dialog of the application 108 and insert symbolic references to variables that are topologically evaluated by a solid unfolder engine. Further, copy/paste commands may be utilized to define the equations using customers internal documentation so that they can directly correlate their internal standards to what's being referenced in an unfolding application.

Users can create their customer algebraic expression based off of four general methods which give them a basis for understanding how a component is being measured, the datum structure is created linearly as well as angularly. Further, once the expressions and bounding conditions are specified, the user can view the unfolded sheet metal pattern dynamically in real time (and automatically without additional user input to manually set the pattern) with the custom expressions being used to create the unfolded pattern that is displayed/rendered.

Logical Flow

Figure 14:
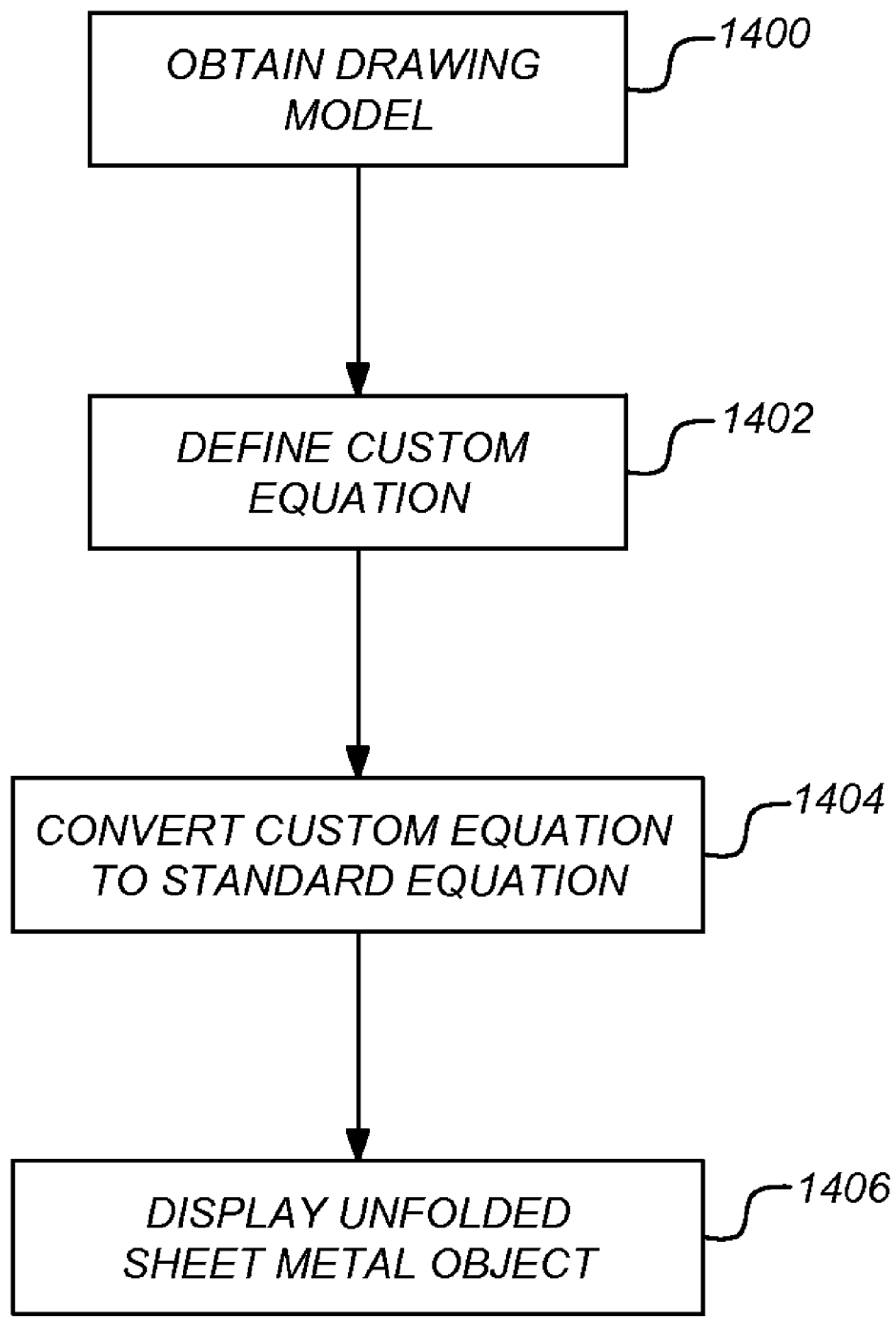
FIG. 14 illustrates the logical flow for utilizing custom equations for the unfolding of sheet metal in a solid modeling application in accordance with one or more embodiments of the invention.

FIG. 14 illustrates the logical flow for utilizing custom equations for the unfolding of sheet metal in a solid modeling application in accordance with one or more embodiments of the invention.

At step 1400, a drawing model consisting of a sheet metal object in a solid modeling is obtained. Such a drawing model may be created or merely retrieved from storage.

At step 1402, user input is accepted by the solid modeling application. The user input defines a custom equation for a first variable that is directly used to calculate a developed length for a bend in the sheet metal object. As used herein, the developed length is the length of the unfolded bend. As described above, the first variable is often used as part of an equation that is based on a particular equation type that may also be selected by the user. The custom equation may also be a non-linear equation. Further, step 1402 may also include specifying one or more bounding conditions for the custom equation. Such specifying can included accepting additional user input that creates a custom bounding condition for a second variable used in the equation. Thus, while the equation itself may define a first variable, a bounding condition may be established for other variables (i.e., second variables) used in the equation.

At step 1404, the custom equation is converted into a standard equation that produces the developed length and is accepted by a modeling kernel of the solid modeling application. In this regard, the modeling kernel may not be capable of directly reading or interpreting the custom equation. However, the modeling kernel has the capability to accept input in a standard format (i.e., a standard equation). The custom equation created by the user provides a specific developed length as a result. Embodiments of the invention evaluate the custom expression to determine the developed length and then back calculate and determine values for the various components of the standard expression that would result in the same developed length. Thus, while the custom expression is not directly used by the modeling kernel, the same result of the custom expression is provided by the modeling kernel.

Such a conversion may consist of dynamically determining a new K-factor to be used in the standard equation that will result in the developed length as determined by the custom equation. In this regard, the different types of equations may all be algebraically related to each other and an automatic (i.e., without additional user input) and dynamic determination and update of a K-factor used in the standard equation can be used to produce the desired result (i.e., the result produced by the custom equation).

It may also be noted that the underlying standard expression is not exposed to the user and the user has no knowledge that a conversion is taking place. Accordingly, from the user's point of view, the custom equation that they enter is being dynamically used by the solid modeling application to produce a developed length. Further, both the standard equation and the custom equation are actively and dynamically associated with the drawing model. Such an association allows for the automatic (i.e., without additional user input) and dynamic update in real time of any displayed model/drawing/bitmap in the solid modeling application based on changes in the custom equation.

At step 1406, the modeling kernel dynamically displays an unfolded version of the sheet metal object based on the standard equation and the calculated developed length, where the standard equation is not exposed to the user. Thus, the dynamic (i.e., real time) unfolded pattern representing the sheet metal object is displayed on a display device and is based on the custom equation created by the user. The custom equation is driving the displayed unfolded pattern (and any resulting developed lengths displayed or maintained) because the results from the custom equation are matched by the standard equation that is processed by the modeling kernel.

In addition to the above, step 1406 may include the step of displaying a bitmap of a bend that indicates a topologically referenced variable of the sheet metal object that is used in the custom equation. In other words, different equation types may be represented via different bitmaps that utilize one or more different variables that can be custom defined by the user and have different bounding conditions as well. Each of the different variables used in the different equation types may be shown graphically in the bitmap (i.e., they are topologically referenced).

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention supports both the creation of user defined custom unfolding equations and the creation of user defined expression bounding conditions. In addition, users can build algebraic equations that contain references to topologically evaluated design measurements during unfolding analysis. Further, the custom defined equation allows a custom method to be assigned to the entire design and react to topological measurements and dynamically calculate user defined unfolding results on a per bend plate basis (and is not a static method that can only be applied to an entire model or certain select bend plates). The ability to manipulate the actual unfolding equation and incorporate priority or machine specific manufacturing nuances as well as the granular control of an evaluated bounding condition, provides an incredibly powerful solution that completely differs from the prior art.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for utilizing custom equations for the unfolding of sheet metal in a solid modeling application, comprising:

obtaining a drawing model comprised of a sheet metal object in the solid modeling application;

displaying an equation editor user interface;

accepting, in the equation editor user interface, user input that custom defines a custom equation for a first variable that is directly used to calculate a developed length for a bend in the sheet metal object;

converting the custom equation into a standard equation that produces the developed length and is accepted by a modeling kernel of the solid modeling application;

the modeling kernel dynamically displaying an unfolded version of the sheet metal object based on the standard equation and the calculated developed length, wherein the standard equation is not exposed to the user.

2. The method of claim 1, wherein the custom equation comprises a non-linear equation.

3. The method of claim 1, further comprising displaying a bitmap of a bend that indicates a topologically referenced variable of the sheet metal object that is used in the custom equation.

4. The method of claim 1, further comprising specifying one or more bounding conditions for the custom equation.

5. The method of claim 4, wherein the specifying comprises accepting user input creating a custom bounding condition for a second variable used in the equation.

6. The method of claim 1, wherein the converting comprises dynamically determining a new k-factor to be used in the standard equation that will result in the developed length as determined by the custom equation.

7. The method of claim 1, wherein the standard equation and custom equation are actively and dynamically associated with the drawing model.

8. An apparatus for utilizing custom equations for the unfolding of sheet metal in a solid modeling application in a computer system comprising:

(a) a computer having a memory;

(b) a solid modeling application executing on the computer, wherein the solid modeling application is configured to:

(i) obtain a drawing model comprised of a sheet metal object;

(ii) display an equation editor user interface;

(iii) accept, in the equation editor user interface, user input that custom defines a custom equation for a first variable that is directly used to calculate a developed length for a bend in the sheet metal object;

(iv) convert the custom equation into a standard equation that produces the developed length and is accepted by a modeling kernel of the solid modeling application;

(v) use a modeling kernel to dynamically display an unfolded version of the sheet metal object based on the standard equation and the calculated developed length, wherein the standard equation is not exposed to the user.

9. The apparatus of claim 8, wherein the custom equation comprises a non-linear equation.

10. The apparatus of claim 8, wherein the solid modeling application is further configured to display a bitmap of a bend that indicates a topologically referenced variable of the sheet metal object that is used in the custom equation.

11. The apparatus of claim 8, wherein the solid modeling application is further configured to specify one or more bounding conditions for the custom equation.

12. The apparatus of claim 11, wherein the solid modeling application is configured to specify by accepting user input creating a custom bounding condition for a second variable used in the equation.

13. The apparatus of claim 8, wherein the solid modeling application is configured to convert by dynamically determining a new k-factor to be used in the standard equation that will result in the developed length as determined by the custom equation.

14. The apparatus of claim 8, wherein the standard equation and custom equation are actively and dynamically associated with the drawing model.

15. An article of manufacture comprising a non-transitory program storage device readable by a computer, tangibly embodying at least one program of instructions executable by the computer to perform method steps of utilizing custom equations for the unfolding of sheet metal in a solid modeling application, the method steps comprising the steps of:

obtaining a drawing model comprised of a sheet metal object in the solid modeling application;

displaying an equation editor user interface;

accepting, in the equation editor user interface, user input that custom defines a custom equation for a first variable that is directly used to calculate a developed length for a bend in the sheet metal object;

converting the custom equation into a standard equation that produces the developed length and is accepted by a modeling kernel of the solid modeling application;

the modeling kernel dynamically displaying an unfolded version of the sheet metal object based on the standard equation and the calculated developed length, wherein the standard equation is not exposed to the user.

16. The article of manufacture of claim 15, wherein the custom equation comprises a non-linear equation.

17. The article of manufacture of claim 15, further comprising the step of displaying a bitmap of a bend that indicates a topologically referenced variable of the sheet metal object that is used in the custom equation.

18. The article of manufacture of claim 15, further comprising the step of specifying one or more bounding conditions for the custom equation.

19. The article of manufacture of claim 18, wherein the specifying comprises accepting user input creating a custom bounding condition for a second variable used in the equation.

20. The article of manufacture of claim 15, wherein the converting comprises dynamically determining a new k-factor to be used in the standard equation that will result in the developed length as determined by the custom equation.

21. The article of manufacture of claim 15, wherein the standard equation and custom equation are actively and dynamically associated with the drawing model.

* * * * *